Sept. 29, 1953  G. L. BROCK  2,653,512
SLIDE PROJECTOR APPARATUS
Filed Aug. 6, 1952  2 Sheets-Sheet 1

INVENTOR.
Gordon L. Brock.
BY Ross & Ross
Attys & Agent

Sept. 29, 1953   G. L. BROCK   2,653,512
SLIDE PROJECTOR APPARATUS
Filed Aug. 6, 1952   2 Sheets-Sheet 2
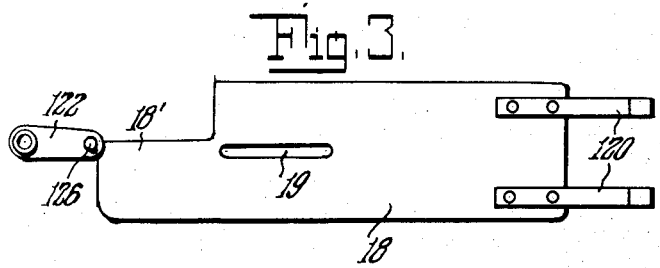
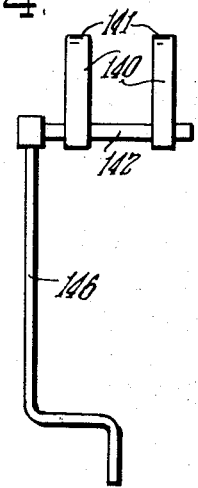
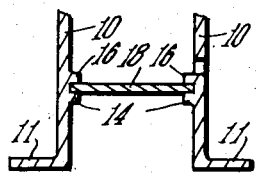
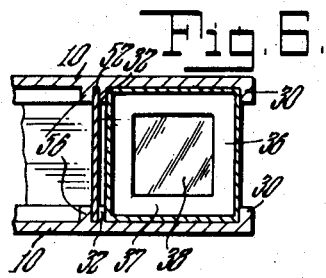
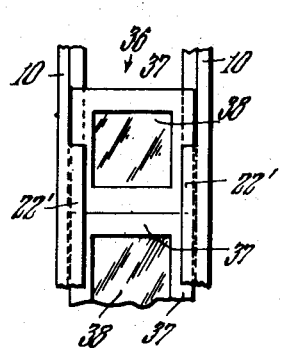
INVENTOR.
Gordon L. Brock.
BY
Atty & Agent.

Patented Sept. 29, 1953

2,653,512

UNITED STATES PATENT OFFICE 2,653,512

SLIDE PROJECTOR APPARATUS

Gordon L. Brock, Springfield, Mass.

Application August 6, 1952, Serial No. 302,939

3 Claims. (Cl. 88—28)

My invention relates to new and useful improvements in apparatus adapted to project upon a screen informative matter such as pictures, illustrations, writings, printed matter, musical scores and the like, which projections emanate from a projection apparatus.

It is the principal object of my invention to cause such material to be displayed in a predetermined time relation.

Generically, this object serves to make available an educational or informatory or entertainment system whereby the human eye receives impressions without strain or effort and in a manner so as to impress themselves upon the mind.

Basically, my invention relates to a projection apparatus for projecting images from transparencies and more particularly to a projection apparatus for automatically projecting a series of transparencies. That is to say, I provide an improved automatic projector which is so constructed that a series of transparencies may be automatically projected singly and in consecutive order in a manner so as to permit the lecturer, educator, salesman or the like who uses the machine to forget the projection apparatus and to devote his full attention to the subject matter under discussion and to his audience.

More particularly, my invention relates to a projector of the type in which a translucent screen is employed and in which the entire projecting apparatus and screen may be contained within a suitable casing. It will be understood, however, that this integral unit does not necessarily form the sole application and structure of the invention, is being conceivable that, and the structure of the invention being designed so that, the projector per se may be used within or without the casing and so that the screen or projection surface arrangement as described herein may be eliminated if desired, in which instance the projection screens of the conventional type may be employed, all without departing from the spirit or scope of my invention.

That is to say, it is one of the primary objects of my invention to provide a projection means which is extremely compact and which is adaptable for arrangement either within a small casing or without the same, all as may be desired. This object, I achieve by a special arrangement of projection means, light source and reflecting system which may be employed with a screen disposed within the casing or a screen of the conventional type disposed without the casing, depending upon the particular desires of the operator.

The device of my invention is particularly valuable in connection with advertising, as in store windows and the like. One serious objection to prior art devices in this connection has been that in order to obtain the desired size of picture upon the screen, a large casing or one of special form, has had to be employed. This objection is obviated in the device of my invention.

Further, in the device of my invention, the pictures to be projected are arranged on a plurality of slides which are automatically and consecutively brought into the proper position to be projected upon the projection surface or screen.

In prior devices known in the art, it has been necessary, in order to magnify them to a size which will be readily seen by a large number of persons, to provide a long throw of the projecting beam of light. This has made necessary the employment of the aforementioned large casings or casings of special form in order to obtain the desired throw. As already mentioned, the need for such large constructions is obviated in the device of my invention.

It is another object of my invention to provide a projector having a simplified conveyor system adapted to carry a plurality of slides consecutively from a magazine to the projection position and thence via a return route back to the magazine where they assume their normal non-operating position and more importantly in the same relative positions as to each other so that upon subsequent showings, they will appear in the same sequence or numerical order.

In sales promotion and service work, as well as in the field of general education, it is desirable to provide pictures in an automatic manner so that the operator is free to stand by the projection screen or to pass among the audience at will and is not hindered by the necessity of manually operating his machine. By the device of my invention, such freedom of action is permitted.

It is further to be appreciated that, in prior art devices, such desideratum as set forth in the paragraph above has been achieved by the employment of an assistant whereby the freedom of action of the instructor or lecturer or salesman has been obtained. By the device of my invention, the necessity for an assistant is obviated and as aforesaid the operator himself is free to move about as he desires, the machine being fully automatic and manpower being required only to initiate operation at the beginning of the performance and to terminate operation at the end of the performance or at any other desired interval.

Prior art systems of this general type have suffered from being complicated, expensive and commercially impractical for extended use. In accordance with the invention herein, a system is provided which is simple, relatively inexpensive, and adaptable for a variety of applications and uses.

A further primary purpose of my invention is to provide structural and operational improvements in devices of the class to which reference has been made, which improvements not only simplify the structure as such, but also provide important distinct advantages in strength, durability and the like.

My invention consists of certain improvements in this art as set forth in the ensuing disclosure and having, with the above, additional objects and advantages as hereinafter developed and whose construction, combination and details of means and manner of operation, and one use of the device will be made manifest in the description of the herewith illustrative apparatus, it being understood that modifications, variations and adaptations may be resorted to within the scope, spirit and principle of the invention as it is more directly claimed hereinbelow.

In the following description and claims, various details will be identified by specific names for convenience. These names, however, are intended to be as generic in their application as the art will permit.

All of the above objects I accomplish by means of such structure and relative arrangements of parts thereof, as will fully appear by a perusal of the description below and by various specific features which will be hereinafter set forth.

To the above cited and other ends and with the foregoing and various other novel features and advantages and other objects of my invention as will become more readily apparent as the description proceeds, my invention consists in certain novel features of construction and in the combination and arrangement of parts as will be hereinafter more particularly pointed out in the claims hereunto annexed and more fully described and referred to in connection with the accompanying drawings wherein:

Fig. 3 is a plan view of the slide ejector plate of the invention;

Fig. 4 is a side elevational view of the slide positioning stops and the slide positioning arm of the invention;

Fig. 5 is a sectional view on the line 5—5 of Fig. 2;

Fig. 6 is a sectional view on the line 6—6 of Fig. 2; and

Fig. 7 is a sectional view on the line 7—7 of of Fig. 2.

Figure 1:
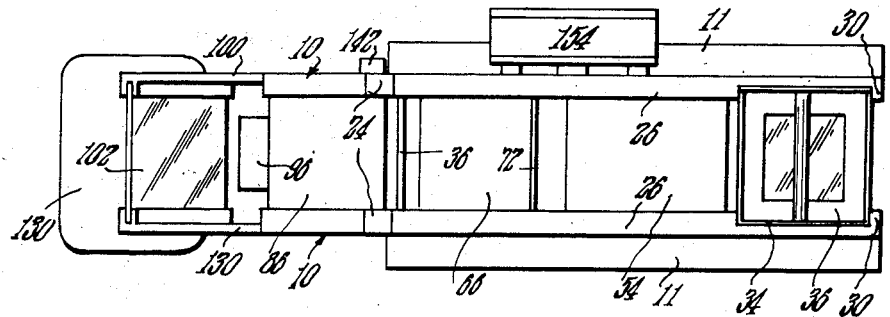
Fig. 1 is a top plan view of the device of my invention.

Referring now to the drawings more in detail, in which similar characters of reference indicate corresponding parts in the several figures, and referring more particularly to the preferred form of my invention selected for illustrative purposes, I have shown a pair of transversely spaced side plates 10 which have relatively spaced flanges or ribs extending inwardly from inner faces thereof which are arranged to form guideways for the movement of operating members and slides and receive opposite edges of wall members as will appear.

It will be understood that the ribs of one side plate correspond with those of the other and that when a rib of one plate is mentioned, the corresponding rib of the other plate is meant as well.

The side plates 10 and 10 are spaced apart in vertically disposed parallel relationship and have outwardly extending feet 11 at their lower edges.

Figure 2:
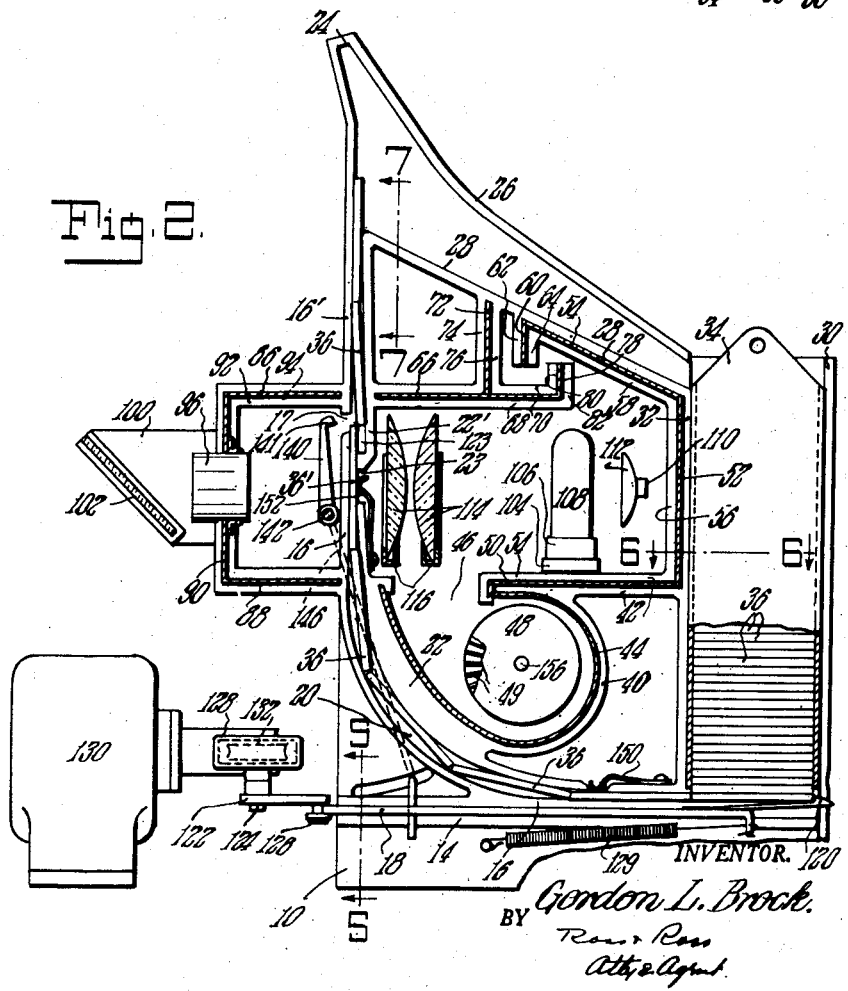
Fig. 2 is a longitudinal sectional view through the device shown in Fig. 1.

A lower horizontal rib 14 and an upper rib 16 spaced thereabove slidably receive a slide ejector 18, see Fig. 2.

The rib 16 curves upwardly to the left, as viewed in Fig. 2, as the outer rib of a guideway 20 which cooperates with an inner rib 22 to form such guideway.

A continuation 16' of the rib 16 is spaced away therefrom at 17, extends upwardly, and at its upper extremity joins a rib 24. Rib 24 in turn joins an uppermost rib 26 which extends downwardly and to the right, as viewed in Fig. 2.

The inner rib 22 terminates below and is spaced away from a continuation 22' of said rib to provide a space 23.

The upper end of the inner rib 22' joins a rib 28 which extends downwardly and to the right, as viewed in Fig. 2.

Ribs 28 provide a guideway for the slides as will hereinafter appear.

An endmost vertically disposed rib 30 at the right hand edge of the plate 10, as viewed in Fig. 2, cooperates with a rib 32 parallel thereto and spaced inwardly therefrom to provide a vertically disposed chute for receiving and holding a magazine 34, which magazine holds a stack of slides 36.

The slides 36, as in Figs. 1, 6 and 7, each have a frame 37 for holding a transparency 38.

The magazine 34 includes opposite and adjacent secured together vertical side walls arranged whereby slides are more or less loosely contained therein in horizontally disposed positions relative thereto and in a stacked relation relative to each other. A suitable opening in the lower end portion of the magazine permits the ejection of the bottommost slide within the member 34 as will hereinafter appear.

A curved rib 40 extends upwardly and away from rib 22 as shown. It joins a horizontal rib 42. A curving wall 44 extends transversely between the side plates 10 and 10 to form a compartment 46 for a blower 48.

Opposite edges of a lower horizontal wall 50 are received between a rib 42 and a rib 54 thereabove.

Opposite edges of a vertical wall 52 joined to the wall 50 are received between a rib 32 and an inner rib 56.

An upper wall 54 joined to vertical wall 50 has opposite side edges receivable between the rib 28 and a rib 58 spaced therebelow.

The upper end portion 60 of wall member 54 extends downwardly between ribs 62 and 64.

An upper horizontal wall 66 has its opposite side edges disposed between spaced ribs 68 and 70. A vertical wall 72 has opposite edges disposed between spaced ribs 74 and 76 and extends upwardly from wall 66. An innermost vertical wall 78, also extending upwardly from wall 66 extends between ribs 80 and 82.

By this arrangement of vertical walls 60, 72 and 78, spaced relative to each other as shown, air is permitted to escape from within the construction without permitting the escape of light from the interior, the members 60 and 78 serving as baffles as shown.

Upper, lower and forward walls 86, 88 and 90 respectively, have their opposite side edges disposed between ribs 92 and 94.

A projection lens system 96 is secured to the forward wall 90.

Extensions 100 of the side plates 10 are arranged to receive, if desired, opposite edges of a mirror or reflector 102 angularly disposed forwardly of the lens and adapted to direct the subject matter being projected to a surface not directly in front of the projection apparatus. Such a means would be employed where the apparatus is disposed within a casing and it is desired to project the subject matter onto a screen in the front of the casing. It will be understood that this is one non-limitative embodiment of the invention, the structure being adapted to function without the use of the mirror 102, same being easily removable therefrom.

A base 104 extending inwardly from one side plate 10 carries a socket 106 which receives the usual projection bulb 108. A bracket 110 extending inwardly from one side plate carries a concave reflector 112 which is disposed rearwardly of the bulb 108.

Condenser lenses 114 and 114 are supported by transverse holders 116 extending between the side plates 10 and 10.

The slide ejector plate 18, previously referred to as shown in Fig. 3, is provided with transversely spaced pawls 120 and 120.

The plate 18 is reciprocated by a dog 122 rotatable on a shaft 124.

The dog has depending downwardly therefrom at its opposite extremity a pin 126. The pin 126 engages the extended portion 18' of the slide ejector plate 18 as shown in Fig. 3. As the dog revolves in a counterclockwise direction, the member 18 will be moved from the left to the right as viewed in Fig. 2. As the dog continues to revolve, the pin 126 will move beyond the extended portion 18' and said member 18 will be returned to its most forward position with the aid of spring member 129 fixed between member 18 and one of the walls 10.

The shaft 124 is rotatable in a housing 128 of a motor 130 and gearing within the housing is provided between the motor shaft, not shown, and the shaft 124.

The motor 130 may be of any form and may be operated by any appropriate control mechanism. It is desired that the motor be operated so as to move the slide ejector plate 18 from the left to the position shown rearwardly thereof so as to eject and feed a slide forwardly from the bottom of the stack. For this purpose, the motor may be of the type to make a predetermined number of revolutions per minute when it is energized. Preferably, the motor will be of the variable speed type whereby the device may be operated as slowly or as fast as may be desired.

As the slide moves forwardly or to the left, the members 120 engage the lowermost slide in the magazine and feed it forwardly. As each slide is removed therefrom, it pushes the slide forwardly thereof along and upwardly in the guideway 20 between the ribs 16 and 22 so that the slides are successively positioned forwardly to the position assumed by slide 36' forwardly of the condenser lenses 114 and 114.

Stops 140 fixed to a transverse shaft 142 which is rotatable in the side plates 10 and 10 are adjacent said plates and have upper ends adapted to engage and position the slides in the position represented by 36'. A slide positioning arm 146 has its upper end secured to an end of shaft 142 and extends downwardly outside of one of the plates 10 and through a slot therein and through a slot 19 in the member 18, said member being shown in Fig. 4.

The slot 19 and the member 146 are arranged so that as member 18 is removing a slide 36 from the magazine, the stops are positioned as shown in Fig. 2. As the member 18 moves to the left, the member 146 is acted upon to swing the stops 140 inwardly so that the upper ends thereof overlie the upper edge of the slide 36 immediately following slide 36' in the order of sequence of projection.

As each slide is fed from the magazine, the uppermost one of the slides in the vertical guideway is pushed upwardly therefrom. Upon abutment with the inclined ribs 26, the slide is diverted downwardly along the upper surfaces of the ribs 28 along which it slides downwardly to a position on the top of the stack within the magazine 34.

Lower hold-downs 150, which are relatively resilient, are secured to ribs 22 and have free outer ends for yieldingly bearing upon opposite sides of the slides as they pass thereunder, and prevent slides in the guideway from sliding backwardly when the magazine is removed.

Similar upper hold-downs 152 urge the slides forwardly against the ribs 16 when in the position shown by slide 36'.

As the stops 140 are rotated to a position where the upper ends 141 thereof engage and position the slides in the position represented by 36', the outer extremities of the ends 141 overlie the slide and extend into an offset 23 in the rib 22' whereby complete engagement of the slide 36' by members 141 is insured.

A motor 154 secured to one of the side plates 10 has a shaft 156 to which is fixed the blower 48. The blower is provided with vanes 49 and, as it is rotated, air is propelled for cooling the condensers, slides, and the like. The warm air is discharged outwardly between the walls 78, 68 and 72, which, as aforesaid, are arranged to provide a light trap.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. Slide projector apparatus comprising in combination, opposite and transversely spaced vertically disposed side plates, intermediate upper and rear and lower wall means extending between and secured to said side plates arranged to form a central compartment open at a forward side thereof, forward upper and lower and front wall means extending between and secured to said side plates disposed to form a forward lens compartment having an open rear side in alignment with and forwardly of the open forward side of the central compartment, said open sides of the compartments providing a projecting position therebetween for successive slides, a reflector and a light source and condenser lenses disposed in said central compartment arranged in horizontal alignment and a projection lens carried by the front wall means of the lens compartment in alignment therewith, said side plates rearwardly of said central compartment arranged to form a vertical chute for a magazine, a magazine formed from opposite and adjacent walls slidably receivable in said chute adapted to hold a stack of slides in superposed horizontal relation and having upper open receiving and lower open discharge ends for receiving and discharging successive slides, said plates provided with pairs of relatively spaced inner and outer ribs extending inwardly from inner faces thereof arranged to provide transversely aligned guideways therebetween for opposite edges of a row of slides extending in end to end relation, said guideways having a lower slide receiving end and extending forwardly from the lower open discharge end of the magazine and then upwardly and terminating in vertical portions between the open sides of the compartments and having upper discharge ends disposed above the adjacent open sides of the compartments, a slide ejector reciprocable horizontally at its opposite sides in adjacent inner faces of said plates in a plane below the lower discharge end of the magazine arranged in forward movements thereof to transfer a lowermost slide of the magazine into the receiving end of said guideways, said guideways arranged whereby slides therein and forwardly of each slide transferred into the guideways are moved forwardly and upwardly thereby so that an uppermost slide is discharged from the upper discharge end of guideways and a slide therebelow is located in projecting position between the open adjacent sides of said compartments, movable stop means to releasably engage and stop successive slides in projecting position thereof, transfer means to receive successive slides from the upper discharge end of the guideways for gravity transfer of them to the upper open end of the magazine, and means for urging successive slides forwardly against the outer guideway forming ribs in projecting position of said slides.

2. Slide projector apparatus set forth in claim 1 wherein said stop means includes a member mounted on said plates for swinging movements to stop position and having a portion to engage the upper end of a slide and operative connections between said member and ejector whereby the former is actuated by the latter.

3. Slide projector apparatus set forth in claim 1 wherein said transfer means includes ribs extending inwardly from inner faces of said plates for opposite edges of slides arranged to incline downwardly and rearwardly from adjacent the upper discharge end of the guideways to the upper open receiving end of the magazine.

GORDON L. BROCK.

References Cited in the file of this patent

UNITED STATES PATENTS

| Number | Name | Date |
|---|---|---|
| 1,165,318 | Carver | Dec. 21, 1915 |
| 1,247,608 | Alguire | Nov. 27, 1917 |
| 1,282,298 | Scott et al. | Oct. 22, 1918 |
| 1,428,347 | Van Altena | Sept. 5, 1922 |
| 1,443,711 | Lauchly | Jan. 30, 1923 |
| 1,543,240 | Teeter | June 23, 1925 |
| 2,593,007 | Cadwell et al. | Apr. 15, 1952 |